Oct. 25, 1932. V. C. NORQUIST 1,884,144
WELDING CLAMP FOR USE IN MANUFACTURING WELDED TANKS
Filed May 20, 1931
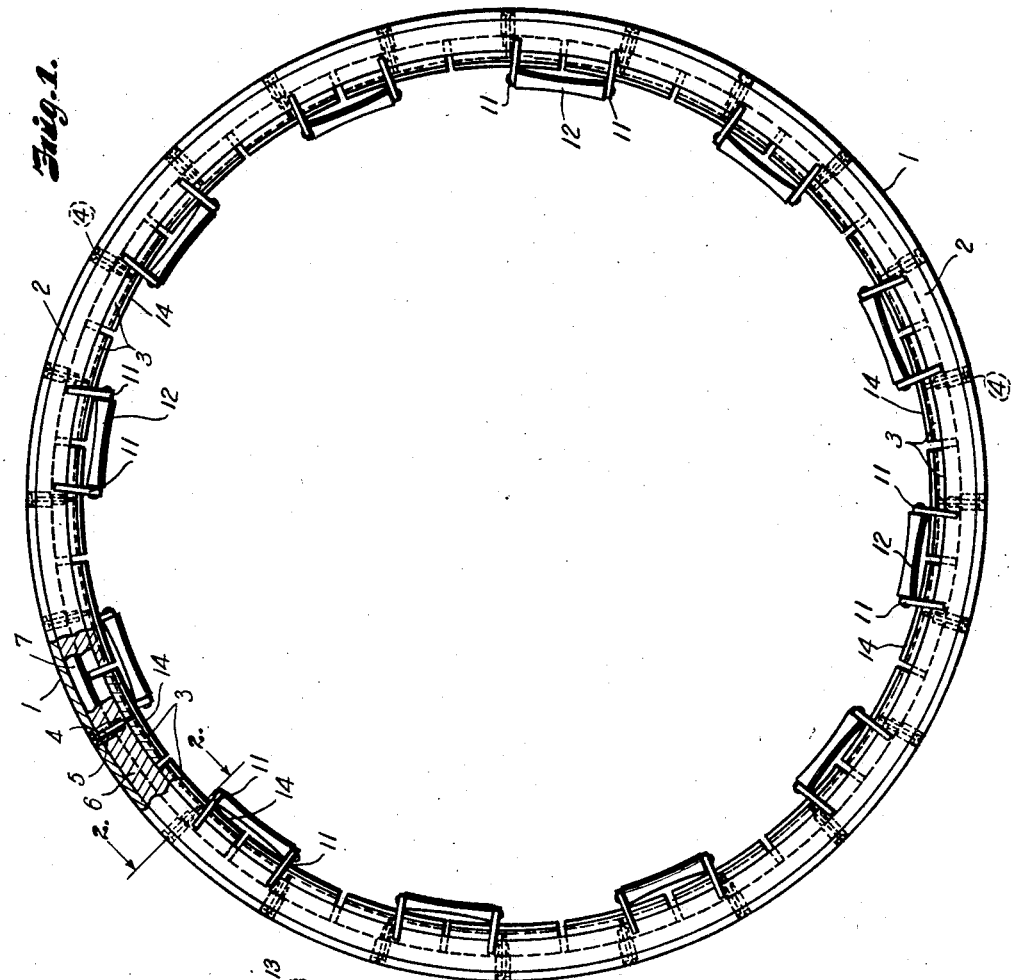
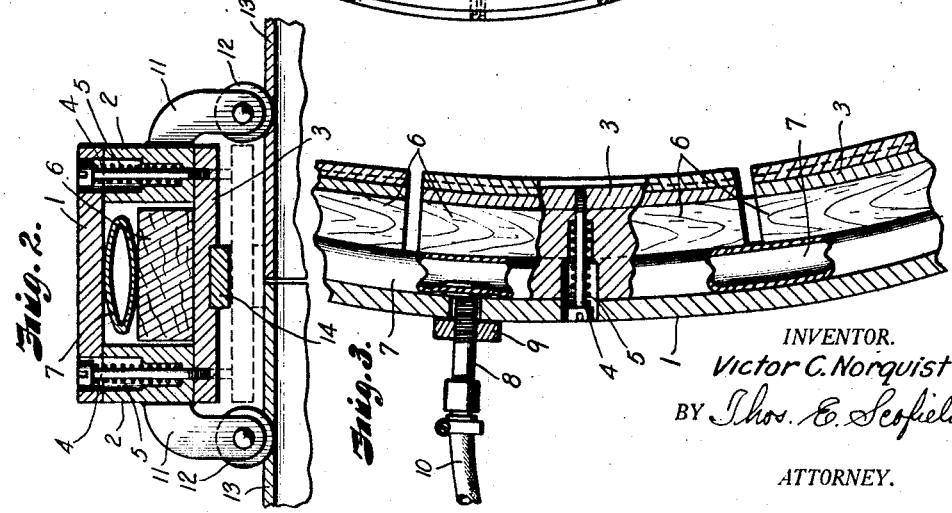
INVENTOR.
Victor C. Norquist
BY Thos. E. Scofield
ATTORNEY.

Patented Oct. 25, 1932

1,884,144

UNITED STATES PATENT OFFICE

VICTOR C. NORQUIST, OF KANSAS CITY, MISSOURI, ASSIGNOR TO BUTLER MANUFACTURING COMPANY, OF KANSAS CITY, MISSOURI, A CORPORATION OF MISSOURI

WELDING CLAMP FOR USE IN MANUFACTURING WELDED TANKS

Application filed May 20, 1931. Serial No. 538,769.

This invention relates to improvements in clamps for manufacturing welded tanks and refers more particularly to a circular element or clamp by means of which tank rings which are to be welded together are held rigidly in an abutting position during the welding operation. The clamp may be used not only for welding the tank rings but also for welding the top and bottom of the tank to the adjacent tank rings.

Among the advantages afforded by this improved type of clamp is the holding of the tank rings rigidly together during the welding operation, in a circular shape, avoiding thereby the necessity of hammering or forcing the abutting edges in order to align the rings during the welding thereof. The use of the clamps eliminates numerous expensive steps in preparing the tank rings for welding and permits the welding of tank rings so that smooth outside seams are exposed in place of ridges of metal produced when plates are welded by the usual method. The elimination of rough seams not only improves the appearance of the tank but obviates the necessity of grinding off excess metal or cracking along the seams due to the weight of the tank bearing upon the small ridges or surface of the welded seams when the tank is rolled or positioned in supporting cradles.

Fig. 1 is a diagrammatic side elevational view of the clamp.

Fig. 2 is a view taken along the lines 2—2 in Fig. 1, looking in the direction of the arrows.

Fig. 3 is an enlarged sectional detail of the clamp with parts broken away to show the construction of the clamp.

Referring to the drawing, the clamp consists of a U-shaped member or element having an outside plate 1, and parallel rails 2. Abutting upon the inner concave edges of the rails are a plurality of shoes or segments 3. These shoes are attached to the rails by means of bolts 4 positioned in sockets drilled through the outside plate and into the rails. Surrounding the bolts are compression springs 5. At one end these springs rest against the bottom of the holes or sockets, while at the upper ends, the springs are held beneath the enlarged heads of the bolts 4. The compression upon the springs holds the shoes normally in contact with the rails 2. The sockets in which the bolts and springs are positioned have shoulders, so that the upper part of the socket is sufficiently large to accommodate the enlarged head of the bolt while the lower end of the socket is of a diameter only sufficiently large to accommodate the spring, and restricts the movement of the head of the bolt substantially within the length of the upper enlarged portion of the socket. In other words, the bolts 4 are screwed into the shoes 3 and due to the springs 5, these shoes are held in contact with the rails 2. Between the rails and behind the shoes are insulating blocks 6 and between the blocks and the plate 1 is a hose or tube 7. Air or any other expansible fluid may be introduced to the hose through a valve stem 8 held in position by means of a lock nut 9 on the plate or rim of the clamp.

The expansible medium supplied to the tube through the valve and hose 10 from any convenient source and at the required pressure expands the tube forcing the blocks away from the rim and overcoming the force of the compression springs 5. With the expansion or enlargement of the tube, the shoes will be moved away from the rails to the dotted line position shown in Fig. 2. The movement of the shoes is limited by the bolt heads contacting upon the shoulders in the sockets or wells previously referred to. On the sides of the rails spaced apart at substantially equal distances around the circumference of the clamp are a plurality of roll supports 11 in which bear the rollers 12. These rollers have a somewhat smaller diameter near their center than at the outer edges, the amount of curvature in the surface of the rollers being substantially the curvature of the inside circumference of the clamp. The function of these rollers is to guide the two steel plates or tank rings 13 which are to be welded as shown in Fig. 2 of the drawing.

In the manufacture of welded tanks, plates are first rolled to produce the proper curvature. A plurality of these plates are welded together to form tank rings of the desired diameter. Two of these rings are then raised by a crane or otherwise so that they can be guided from opposite sides of the clamp by the rollers 12 to an abutting position as shown in Fig. 2 of the drawing. When positioned as shown with their edges abutting, the tube 7 is expanded by introducing air, gas, water or any other suitable type of fluid into the tube. The enlargement of the diameter of the tube moves the shoes or segments 3 inwardly against the compression springs 5 surrounding the bolts 4 until the shoes have been moved to a position corresponding with the dotted line position in Fig. 2. Strips of metal having a high fusion temperature such as copper stellite, carbon or other fusing material, designated in the drawing as 14 are positioned centrally of the shoes and serve as backing up strips during the welding of the rings. These strips are shown in the drawing to be the same length as the shoes, but it is contemplated they may be made to overlap by fitting the overlapping edges so as to form a continuous backing up strip when the shoes have been expanded by the expansible tube to grip the abutting edges of the tank ring. The inflation of the tube 7 moves all of the shoes uniformly due to the functioning of the equalizing bolts 4 and the equal tension maintained by the compression springs against the tube and the distribution of the fluid throughout the tube. As a consequence, all of the backing up strips contact the abutting edges of the tank rings and serve to hold the edges to be welded uniformly and firmly in position. The contacting of the backing up strips on the shoes holds the abutting edges of the rings so that when the weld is completed the tank will be perfectly circular or round in form. The welding is done from the inside and it is contemplated that the clamp may be rotated so that the welding can be accomplished by welding in one position rather than following the seams around the inside of the tank.

It is also contemplated that more than one clamp may be used simultaneously and a plurality of rings welded up at the same time, thereby materially reducing the time necessary to manufacture a tank while at the same time producing an improved type of seam. As the welding is done from the inside, and the outside seam is backed up by a continuous strip as shown in Fig. 2, the outside seams exposed are practically invisible. The ridge of metal, usually so apparent in welded tanks, is by this method entirely eliminated. Besides welding together the tank rings, both the bottom and top can be welded by using the clamps, thus reducing considerably the labor and expense of fitting and separately welding by conventional methods the enclosing ends of the tanks.

In order to appreciate the advantages of the method disclosed, one of the conventional methods of making welded tanks will be referred to. By this conventional method, the steel plate is rolled and the plates welded together in the form of rings of the desired diameter. Into these tank rings are then forced circular pipes which serve as a skeleton structure or support to hold the tank rings in circular form to facilitate the welding or joining of the abutting edges of the rings. The rings are then positioned on supporting rolls with the abutting edges to be welded in close proximity. It is then necessary to tack together the abutting edges of the tank rings either on the outside or inside and to do this it is necessary to fit by hammering or forcing the edges of the rings to assure the proper alignment of the edges to be welded. The abutting edges of the tank rings are then welded, both inside and outside, where a strong joint is desired. Some manufacturers weld only from one side, in which case the opposite side of the joint often exposes irregularities due to the accumulation of metal or the lack of metal in the joint. After the tank rings have been welded together, a bottom or end is welded on, the circumference of the bottom having been flanged so as to furnish an abutting edge to the last tank ring. Here, again, considerable hammering and fitting is necessary to produce alignment of the abutting edges. After one end is on, the rings of pipe within the tank used to support the tank rings during the welding thereof are cut and removed. Usually one of the rings of pipe supporting the open end is left in the tank until the final closure is welded in position. After this has been done, the last pipe support ring is burned out with an acetylene torch and the sections of the pipe removed through a manhole.

The improved method will obviate the necessity of using the pipe rings and the difficulty encountered in fitting the abutting edges of the tank rings prior to welding. The clamps will hold the tank rings perfectly round and the final product will not only be more accurate but the welded seams will be smooth and expose only a plane surface from the outside.

As suggested, the elimination of ridges of metal along the seams will reduce considerably failure occasioned by the weight of the tank being supported by the raised seams when rolling the tanks or setting them in supporting cradles.

I claim as my invention:

1. A clamp for welding tank rings in the manufacture of welded tanks comprising a circular element somewhat larger in diameter than the tank rings to be welded, a plurality of shoes or segments within the circular element, an expansible means between the circular element and shoes adapted to cause the shoes to firmly grip the abutting edges of the tank to be welded during the welding operation.

2. A clamp for welding tank rings in the manufacture of welded tanks comprising a circular element somewhat larger in diameter than the tank rings to be welded, a plurality of shoes or segments within the circular element, an expansible means between the circular element and shoes adapted to cause the shoes to firmly grip the abutting edges of the tank to be welded during the welding operation, strips of metal having a high fusion temperature positioned centrally of the shoes on their inner concave surfaces and adapted to back up the seams during the welding operation.

3. A clamp for welding tank rings in the manufacture of welded tanks comprising a circular element somewhat larger in diameter than the rings and contractible means within the circular element for holding the abutting edges of the tank rings during the welding thereof, spaced apart rollers on both sides of the circular element adapted to guide the abutting edges of the tank to be welded to a welding position.

4. A welding clamp comprising a circular member having a fixed diameter, a plurality of independent clamping shoes movably supported directly by and positioned around the periphery of said circular member and means for imparting a simultaneous radial movement to said shoes to move them to clamping position.

In testimony whereof I affix my signature.

VICTOR C. NORQUIST.